US012380831B2

(12) United States Patent
Lee et al.

(10) Patent No.: US 12,380,831 B2
(45) Date of Patent: Aug. 5, 2025

(54) DISPLAY DEVICE AND METHOD OF DRIVING SAME

(71) Applicant: LG Display Co., Ltd., Seoul (KR)

(72) Inventors: Tae Young Lee, Paju-si (KR); Ji Su Choi, Paju-si (KR); A Rom So, Paju-si (KR)

(73) Assignee: LG Display Co., Ltd. (KR)

( * ) Notice: Subject to any disclaimer, the term of this patent is extended or adjusted under 35 U.S.C. 154(b) by 45 days.

(21) Appl. No.: 18/230,224

(22) Filed: Aug. 4, 2023

(65) Prior Publication Data

US 2024/0169885 A1 May 23, 2024

(30) Foreign Application Priority Data

Nov. 23, 2022 (KR) ........................ 10-2022-0158223

(51) Int. Cl.
*G09G 3/20* (2006.01)
*G09G 3/3258* (2016.01)

(52) U.S. Cl.
CPC ......... *G09G 3/2096* (2013.01); *G09G 3/3258* (2013.01); *G09G 2320/0233* (2013.01); *G09G 2320/045* (2013.01); *G09G 2330/021* (2013.01)

(58) Field of Classification Search
CPC ...... G09G 3/20; G09G 3/2096; G09G 3/3233; G09G 3/3258; G09G 3/3225; G09G 2320/045; G09G 2320/0233; G09G 2330/021
See application file for complete search history.

(56) References Cited

U.S. PATENT DOCUMENTS

2015/0255017 A1* 9/2015 Kim .................... G09G 3/3258 445/24

* cited by examiner

*Primary Examiner* — Deeprose Subedi
(74) *Attorney, Agent, or Firm* — Fish & Richardson P.C.

(57) ABSTRACT

A display device includes a display panel including pixels connected to a plurality of power input lines and receiving EVSS power, a first power line connected to one end of each of the power input lines to apply first EVSS power, a second power line connected to the other end of each of the power input lines to apply second EVSS power having the same electric potential as that of the first EVSS power, and a power supply configured to apply the first EVSS power through the first power line or to apply the second EVSS power through the second power line.

12 Claims, 9 Drawing Sheets

DISPLAY DEVICE AND METHOD OF DRIVING SAME

This application claims the priority of Korean Patent Application No. 10-2022-0158223, filed on Nov. 23, 2022, which is hereby incorporated by reference in its entirety.

BACKGROUND

Field of the Disclosure

The present disclosure relates to a display device and a method of driving the same.

Description of the Background

Organic light emitting displays that have recently been in the limelight as display devices use an organic light emitting diode (OLED) that emits light by itself and thus have advantages of a high response speed, a high contrast ratio, high luminous efficacy, high luminance, a wide viewing angle, and the like.

Such an organic light emitting display has sub-pixels including organic light emitting diodes (OLEDs) and driving transistors for driving the OLEDs and disposed in a matrix form and may display an image by controlling the luminance of each sub-pixel according to gray levels of image data. A high-potential voltage EVDD and a low-potential voltage EVSS for driving the OLED are supplied to each sub-pixel, and luminance may be controlled by adjusting the amount of current flowing through the OLED using the driving transistor.

However, a driving voltage supplied to each sub-pixel may vary depending on the distance from a power supply source, and such variation in the driving voltage may cause luminance non-uniformity, thereby degrading the quality of an image.

SUMMARY

Accordingly, the present disclosure to solve the above-described problems provide a display device capable of improving luminance uniformity of a screen by reducing variation in a low-potential voltage EVSS supplied to sub-pixels and a method of driving the same.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the disclosure, as embodied and broadly described herein, a display device includes a display panel including pixels connected to a plurality of power input lines and receiving EVSS power, a first power line connected to one end of each of the power input lines to apply first EVSS power, a second power line connected to the other end of each of the power input lines to apply second EVSS power having the same electric potential as that of the first EVSS power, and a power supply configured to apply the first EVSS power through the first power line or to apply the second EVSS power through the second power line.

The display device may further include a timing controller configured to control the power supply to apply the first EVSS power in an active period for displaying an image on the display panel and to apply the second EVSS power in a vertical blank period.

The power supply may include a first power controller configured to generate the first EVSS power and to apply the first EVSS power to the first power line under the control of the timing controller.

The power supply may include a second power controller configured to output a power signal and a control signal for generating the second EVSS power under the control of the timing controller, and an EVSS buffer configured to generate the second EVSS power according to the power signal and the control signal and to apply the second EVSS power to the second power line.

The second power controller may output, to the EVSS buffer, high-potential power EVSS_High for generating the second EVSS power, low-potential power EVSS_Low lower than the high-potential power EVSS_High, and switching control signals for controlling output of the high-potential power EVSS_High and the low-potential power EVSS_Low.

The EVSS buffer may include a first switch turned on/off according to a first switching control signal received from the second power controller to apply the high-potential power to an output terminal of the EVSS buffer, and a second switch turned on/off according to a second switching control signal received from the second power controller to apply the low-potential power to the output terminal of the EVSS buffer.

The EVSS buffer may include a first TFT having a gate electrode to which the first switching control signal received from the second power controller is input, a first electrode connected to a supply line of the high-potential power, and a second electrode connected to an output terminal of the EVSS buffer, and a second TFT having a gate electrode to which the second switching control signal received from the second power controller is input, a first electrode connected to the output terminal of the EVSS buffer, and a second electrode connected to a supply line of the low-potential power.

The second TFT may be turned on in the vertical blank period to apply the low-potential power to the second power line through the output terminal of the EVSS buffer such that the low-potential power is supplied as the second EVSS power.

The second TFT may be turned on in a first period within the vertical blank period to apply the low-potential power to the output terminal of the EVSS buffer and then turned off, and the first TFT may be turned on in a second period after the first period to apply the high-potential power to the output terminal of the EVSS buffer such that the high-potential power is supplied as the second EVSS power.

The EVSS buffer may further include a capacitor having a first electrode connected to the gate electrode of the first TFT and a second electrode connected to the output terminal of the EVSS buffer, and a second TFT having a gate electrode to which the second switching control signal is input, a first electrode connected to the output terminal of the EVSS buffer, and a second electrode connected to the supply line of the low-potential power.

The EVSS buffer may further include a capacitor having a first electrode connected to the gate electrode of the first TFT and a second electrode connected to a first node, a third TFT having a gate electrode to which a third switching control signal received from the second power controller is input, a first electrode connected to the first node, and a second electrode connected to the supply line of the low-potential power, and a fourth TFT having a gate electrode to which a fourth switching control signal received from the second power controller is input, a first electrode connected to the first node, and a second electrode connected to the output terminal of the EVSS buffer.

In another aspect of the present disclosure, a method of driving a display device including pixels connected to a plurality of power input lines and receiving EVSS power includes applying first EVSS power using a first power line connected to one end of each of the power input lines, to which the first EVSS power is applied, in an active period for displaying an image, and applying the first EVSS power using a second power line connected to the other end of each of the power input lines, to which second EVSS power having the same electric potential as that of the first EVSS power is applied, in a vertical blank period.

The applying of the first EVSS power using the second power line in the vertical blank period may include applying low-potential power lower than the second EVSS power to the second power line in a first period within the vertical blank period, and applying the same power as the second EVSS power to the second power line in a second period after the first period.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect (of the disclosure and together with the description serve to explain the principle of the disclosure.

In the drawings.

DETAILED DESCRIPTION

The advantages, features and methods for accomplishing the same of the present disclosure will become more apparent through the following detailed description with respect to the accompanying drawings. However, the present disclosure is not limited by aspects described below and is implemented in various different forms, and the aspects are provided so that this disclosure will be thorough and complete, and will fully convey the scope of the disclosure to those skilled in the art. The present disclosure is defined by the scope of the claims.

Shapes, sizes, ratios, angles, numbers, etc. shown in the figures to describe aspects of the present disclosure are exemplary and thus are not limited to particulars shown in the figures. Like numbers refer to like elements throughout the specification. It will be further understood that, when the terms "include," "have" and "comprise" are used in the present disclosure, other parts may be added unless "—only" is used. An element described in the singular form is intended to include a plurality of elements unless context clearly indicates otherwise.

In interpretation of a component, the component is interpreted as including an error range unless otherwise explicitly described.

It will be understood that, when an element is referred to as being "on," "above," "under" or "by" another element, it may be "directly" on or under another element or may be "indirectly" formed such that an intervening element is also present.

In the following description of the aspects, "first" and "second" are used to describe various components, but such components are not limited by these terms. The terms are used to discriminate one component from another component. Accordingly, a first component mentioned in the following description may be a second component within the technical spirit of the present disclosure.

Like numbers refer to like elements throughout the specification. Hereinafter, aspects of the present disclosure will be described in detail with reference to the attached drawings. In the following description, if a detailed description of known techniques associated with the present disclosure would unnecessarily obscure the gist of the present disclosure, detailed description thereof will be omitted.

A display device according to the present disclosure may be realized by a television system, a video player, a personal computer (PC), a home theater, a vehicle electric apparatus, and a smartphone, but the present disclosure is not limited thereto. The display device according to the present disclosure may be realized by a light emitting display device (LED), a quantum dot display device (QDD), a liquid crystal display device (LCD), or the like. However, a light emitting display device that directly emits light based on inorganic light emitting diodes or organic light emitting diodes will be described as an example for convenience of description.

Figure 1:
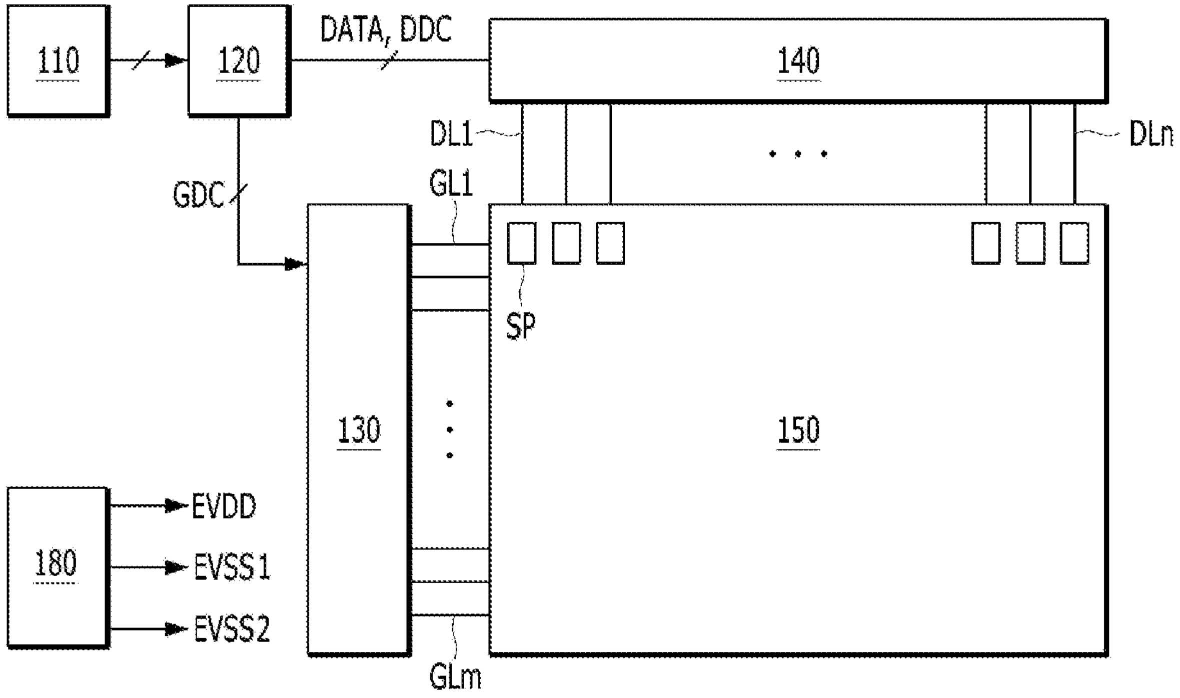
FIG. 1 is a schematic block diagram of a display device according to an aspect of the present disclosure.
Figure 2:
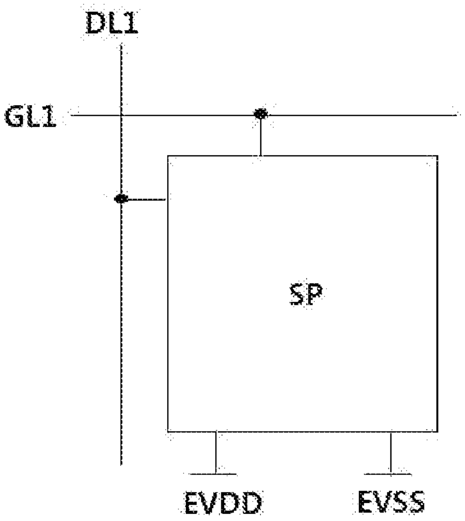
FIG. 2 is a schematic configuration diagram of a sub-pixel shown in FIG. 1.

FIG. 1 is a schematic block diagram of a display device according to an aspect of the present disclosure, and FIG. 2 is a schematic configuration diagram of a subpixel SP shown in FIG. 1.

Referring to FIGS. 1 and 2, the light emitting display device may include an image provider 110, a timing controller 120, a scan driver 130, a data driver 140, a display panel 150, and a power supply 180.

The image provider 110 (e.g., a set or a host system) may output various driving signals together with an externally supplied image data signal or an image data signal stored in an internal memory. The image provider 110 may supply data signals and various driving signals to the timing controller 120.

The timing controller 120 may output a gate timing control signal GDC for controlling the operation timing of the scan driver 130, a data timing control signal DDC for controlling the operation timing of the data driver 140, and various synchronization signals (e.g., a vertical synchronization signal Vsync, a horizontal synchronization signal Hsync, and the like). The timing controller 120 may supply a data signal DATA supplied from the image provider 110 to the data driver 140 together with the data timing control signal DDC. The timing controller 120 may be implemented in the form of an integrated circuit (IC) and mounted on a printed circuit board, but is not limited thereto.

The scan driver 130 may output a scan signal in response to the gate timing control signal GDC supplied from the timing controller 120. The scan driver 130 may supply scan signals to sub-pixels SP included in the display panel 150 through gate lines GL1 to GLm. The scan driver 130 may be implemented in the form of an IC or directly formed on the display panel 150 in a gate-in-panel structure, but is not limited thereto.

The data driver 140 may sample and latch the data signal DATA in response to the data timing control signal DDC supplied from the timing controller 120, convert the digital data signal into an analog data voltage on the basis of a gamma reference voltage, and output the analog data voltage. The data driver 140 may supply data voltages to the sub-pixels SP included in the display panel 150 through data lines DL1 to DLn. The data driver 140 may be implemented in the form of one or more source driver integrated circuits (SDICs) and mounted on the display panel 150 or mounted on a printed circuit board, but is not limited thereto.

The display panel 150 may receive driving power such as a high-potential driving voltage EVDD and a low-potential driving voltage EVSS and display an image in response to driving signals such as a scan signal and a data signal. The sub-pixels SP of the display panel 150 directly emit light. The display panel 150 may be manufactured based on a rigid or flexible substrate such as a glass, silicon, or polyimide substrate. Further, the sub-pixels SP emitting light may include red, green, and blue pixels or red, green, blue, and white pixels.

One sub-pixel SP may include a pixel circuit including a switching transistor, a driving transistor, a capacitor, and an organic light emitting diode (OLED). As shown in FIG. 2, one sub-pixel SP may receive the high-potential driving voltage EVDD and the low-potential driving voltage EVSS for driving the OLED and may be connected to the first data lines DL1 and the first gate line GL1 to receive driving signals including a scan signal and a data voltage. The sub-pixels SP used in the display device may be configured as various types of circuits that directly emit light. In addition to OLEDs emitting light, there are various compensation circuits for compensating for deterioration of driving transistors that supply driving current to the OLEDs. Accordingly, the sub-pixel SP is simply illustrated in the form of a block.

The power supply 180 generates power having various voltages for driving the display device based on an external input voltage supplied from the outside. For example, the power supply 180 may generate the high-potential driving voltage EVDD and the low-potential driving voltage EVSS for driving the sub-pixels SP and output the same to corresponding power lines. To supply the low-potential driving voltage EVSS for driving the sub-pixels SP, the power supply 180 according to an aspect of the present disclosure may generate a first low-potential voltage EVSS1 and a second low-potential voltage EVSS2 having the same potential and respectively supply the first and second low-potential voltages EVSS1 and EVSS2 to one side and the other side of the display panel 150. EVSS rising in which the potential of the low-potential driving voltage EVSS supplied to the sub-pixels SP increases as the distance from an input point increases may occur. Therefore, in an aspect of the present disclosure, it is possible to sink the electric potential of power increasing due to EVSS rising and supply the uniform low-potential driving voltage EVSS regardless of position in the display panel 150 by applying the first low-potential voltage EVSS1 to one side of a low-potential driving voltage supply line and applying the second low-potential voltage EVSS2 having substantially the same electric potential as the first low-potential voltage EVSS1 to the other side.

Meanwhile, in the above description, the timing controller 120, the scan driver 130, and the data driver 140 are individual components. However, one or more of the timing controller 120, the scan driver 130, and the data driver 140 may be integrated into one IC depending on how the light emitting display device is implemented.

Figure 3:
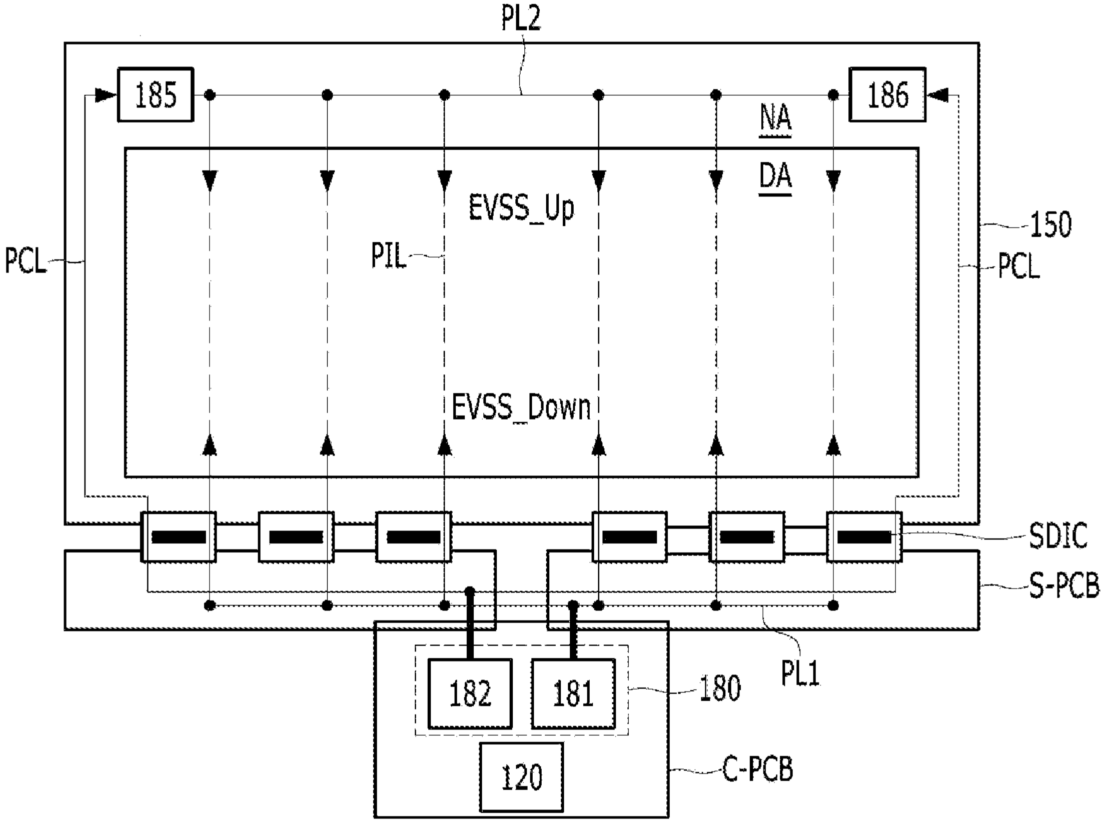
FIG. 3 is a diagram for describing a power supply structure of a display device according to a first aspect of the present disclosure.

FIG. 3 is a diagram for describing a power supply structure of a display device according to a first aspect of the present disclosure.

A display device having a power supply structure according to the first aspect includes a display panel 150, a source driver integrated circuit SDIC, a source PCB S-PCB, a control PCB C-PCB including a timing controller 120 and a power supply 180, and EVSS buffers 185 and 186.

The display panel 150 includes a display area DA in which sub-pixels SP are disposed to display an image, and a non-display area NA outside the display area DA. Power input lines PIL for applying EVSS power to the sub-pixels SP are formed in the display area DA. The sub-pixels SP are connected to the power input lines PIL to receive the EVSS power.

One or more source driver ICs SDIC may be provided and arranged on one side of the display panel 150. The source driver ICs SDIC may be connected to a bonding pad of the display panel 150 using tape automated bonding (TAB) or chip on glass (COG), or may be directly disposed on the display panel 150. For example, in the aspect shown in FIG. 3, the plurality of source driver ICs SDIC is attached in a row to the bottom of the display panel 150 and interconnects the display panel 150 and the source PCB S-PCB. The source driver ICs SDIC may transfer driving signals including a data voltage supplied from the control PCB C-PCB to the display panel 150.

The source PCB S-PCB is connected to the display panel 150 from the lower side of the display panel 150 through an FPCB and may be connected to the control PCB C-PCB through a flexible flat cable (FPC). The source PCB S-PCB may transfer driving signals including a scan signal and a data voltage provided from the control PCB C-PCB to the display panel 150 for driving the display panel 150 and driving voltages such as the high-potential driving voltage EVDD and the low-potential driving voltage EVSS.

The control PCB C-PCB may be connected to the source PCB S-PCB through a cable FPC. This control PCB C-PCB may include the timing controller 120 and the power supply 180. In addition, a memory (not shown) for storing various parameters or operation data necessary to drive the display panel 150 may be disposed on the control PCB C-PCB.

The power supply 180 located on the control PCB C-PCB may include a first power controller 181 that applies first EVSS power to one side of the display panel 150 and a second power controller 182 that applies second EVSS power to the other side of the display panel 150. The aspect shown in FIG. 3 illustrates a case in which the first power controller 181 applies EVSS_Down power, which is the first EVSS power, to the lower side of the display panel 150, which is one side of the display panel 150, and the second power controller 182 applies the EVSS_Up power, which is the second EVSS power, to the upper side of the display panel 150, which is the other side of the display panel 150.

The EVSS_Down power is EVSS power that is input to drive the sub-pixels SP. The EVSS_Down power is input to the lower ends of the power input lines PIL arranged in the display panel 150 and is transferred to the sub-pixels SP connected to each power input line PIL.

The EVSS_Up power is power that stabilizes the EVSS_Down power applied to the lower ends of the power input lines PIL. The EVSS_Up power may be applied to the upper ends of the power input lines PIL to sink a rising voltage generated in the EVSS_Down power, thereby stabilizing the EVSS_Down power to the original electric potential. Accordingly, the EVSS_Up power may be generated such that it has the same voltage as the EVSS_Down power. The EVSS_Up power is power for sinking a rising voltage generated in the EVSS_Down power, and may be applied during a vertical blank period in which input image data is not written in the sub-pixels SP. The vertical blank period refers to a period in which a data enable signal DE is maintained at a low logic level. The vertical blank period is disposed between vertical active periods in which input image data is written in the sub-pixels SP.

To apply the EVSS_Down power to the lower ends of the power input lines PIL of the display panel 150, the source PCB S-PCB may include a first power line PL1 through which the EVSS_Down power is received from the first power controller 181 and transferred to each power input line PIL. The first power controller 181 generates the EVSS_Down power for driving the sub-pixels SP under the control of the timing controller 120. The EVSS_Down power generated by the first power controller 181 is input to the lower ends of the power input lines PIL through the first power line PL1 and transferred to the subpixels SP connected to each power input line PIL.

To apply the EVSS_Up power to the upper ends of the power input lines PIL of the display panel 150, the display device may include a second power line PL2, EVSS buffers 185 and 186, and an EVSS control line PCL. The second power line PL2 extends in the lateral direction in the upper region of the display panel 150 and is connected to the upper ends of the power input lines PIL. The EVSS buffers 185 and 186 are disposed at both ends of the second power line PL2. The EVSS control line PCL may transfer a power signal and a power control signal output from the second power controller 182 to the EVSS buffers 185 and 186. The EVSS control line PCL may be positioned in the left and right non-display areas NA of the display panel 150. The second power controller 182 generates a power signal and a power control signal for applying the EVSS_Up power under the control of the timing controller 120 and outputs the same to the EVSS control line PCL. The EVSS buffers 185 and 186 apply the EVSS_Up power to the second power line PL2 according to the power signal and the power control signal provided by the second power controller 182.

With this configuration, the EVSS_Down power for driving the sub-pixels SP, applied from the first power controller 181, is input to the lower ends of the power input lines PIL and transferred to sub-pixels SP connected to the power input lines PIL. The EVSS_Up power applied from the second power controller 182 is applied to the upper ends of the power input lines PIL in a vertical blank period in which input image data is not written in the sub-pixels SP, and if electric potential variation, such as EVSS rising, occurs, stabilizes the electric potential variation to the original electric potential of the EVSS_Down power.

Figure 4:
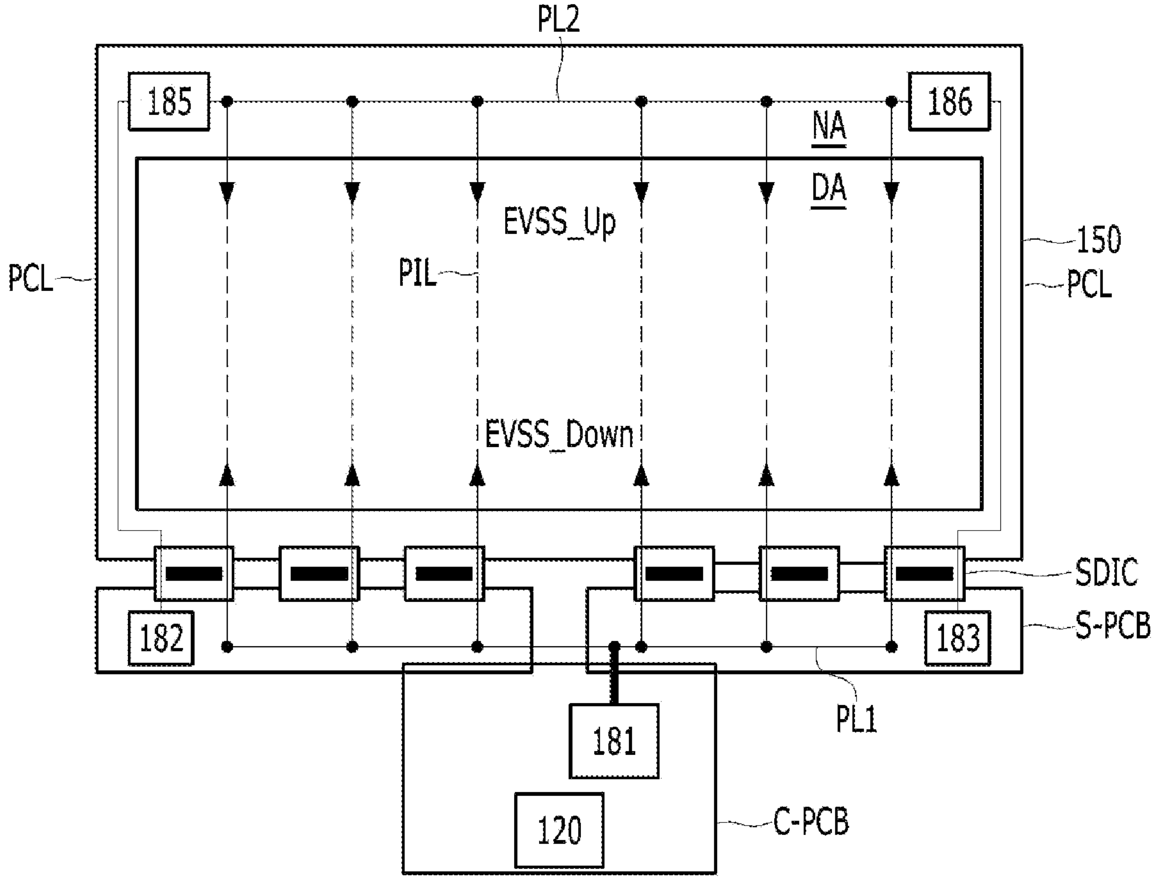
FIG. 4 is a diagram for describing a power supply structure of a display device according to a second aspect of the present disclosure.

FIG. 4 is a diagram for describing a power supply structure of a display device according to a second aspect of the present disclosure. Both the first power controller 181 for applying the EVSS_Down power and the second power controller 182 for applying the EVSS_Up power are formed on the control PCB C-PCB in the display device according to the first aspect, whereas the first power controller 181 for applying the EVSS_Down power is located on the control PCB C-PCB and second power controllers 182 and 183 for applying the EVSS_Up power are located on the source PCB S-PCB in the display device according to the second aspect. The functions of other components are the same as those of the first aspect.

According to the second aspect, to apply the EVSS_Up power input to the upper end of the display panel 150, the second power controllers 182 and 183 may be provided on the left and right sides of the source PCB S-PCB. The second power controller 182 located on the left side of the source PCB S-PCB applies a power signal and a power control signal for applying the EVSS_Up power to the EVSS buffer 185 located on the left side of the second power line PL2 through the EVSS control line PCL. The second power controller 183 located on the right side of the source PCB S-PCB applies a power signal and a power control signal for applying the EVSS_Up power to the EVSS buffer 186 located on the right side of the second power line PL2 through the EVSS control line PCL. Each of the EVSS buffers 185 and 186 applies the EVSS_Up power to the second power line PL2 according to the input power signal and power control signal.

Under the control of the timing controller 120, each of the second power controllers 182 and 183 generates the power signal and the power control signal for applying the EVSS_Up power in a vertical blank period and outputs the same to the corresponding EVSS control line PCL.

Figure 5:
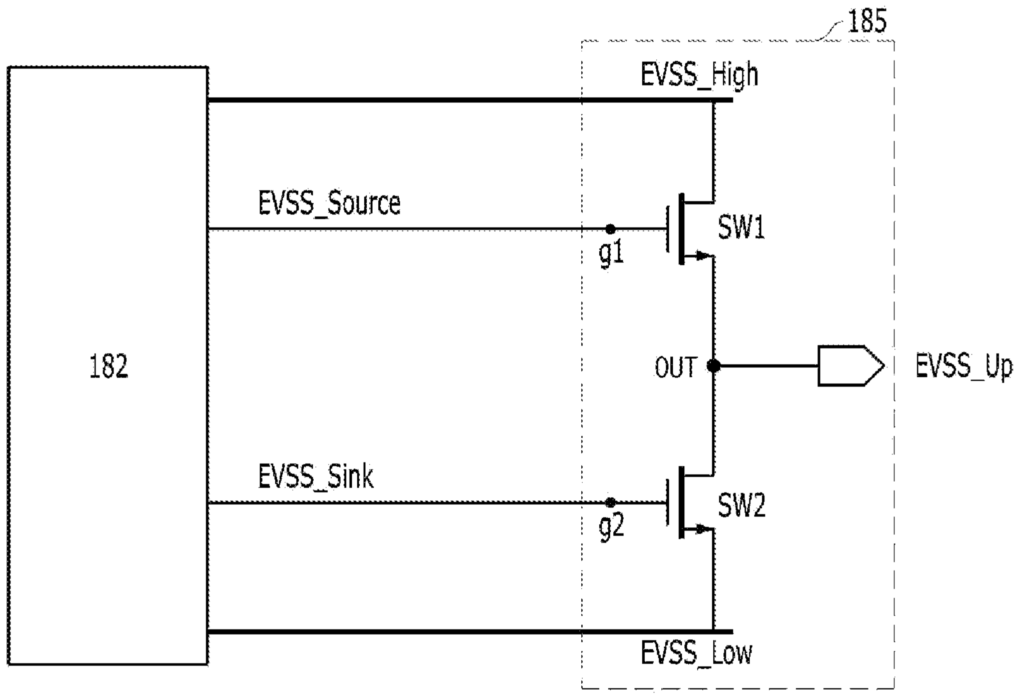
FIG. 5 is a diagram for describing structures of a second power controller and an EVSS buffer for applying EVS-S_Up power according to an aspect of the present disclosure.

FIG. 5 is a diagram for describing structures of the second power controller 182 and the EVSS buffer 185 for applying the EVSS_Up power according to an aspect of the present disclosure.

The second power controller 182 generates and outputs EVSS_High power, EVSS_Low power, an EVSS_Source signal, and an EVSS_Sink signal under the control of the timing controller 120. The EVSS_High power and the EVSS_Low power are used to generate the EVSS_Up power, and the EVSS_High power having a higher voltage than the EVSS_Up power and the EVSS_Low power having a lower voltage than the EVSS_Up power may be set depending on a target voltage of the EVSS_Up power.

The EVSS buffer 185 receives the EVSS_High power, EVSS_Low power, EVSS_Source signal, and EVSS_Sink signal from the second power controller 182 and outputs the EVSS_Up power. The EVSS buffer 185 may include a first switch SW1 and a second switch SW2 that are turned on/off according to the EVSS_Source signal and the EVSS_Sink signal to apply the EVSS_High power or the EVSS_Low power to the output terminal OUT of the buffer 185.

The first switch SW1 and the second switch SW2 may be implemented as thin film transistors (TFTs) in an n-type metal oxide semiconductor field effect transistor (MOSFET) structure or TFTs in a p-type MOSFET structure. A TFT is a three-electrode device including a gate, a source, and a drain. In the case of an n-type TFT (NMOS), electrons are carriers, and thus a source voltage is lower than a drain voltage such that electrons may flow from the source to the drain. On the other hand, in the case of a p-type TFT (PMOS), holes are carriers, and thus the source voltage is higher than the drain voltage such that holes may flow from the source to the drain. In this specification, an example of a case in which the first switch SW1 and the second switch SW2 are implemented as n-type TFTs (NMOS) will be described.

The gate electrode of the first switch SW1 receives the EVSS_Source signal, the drain electrode thereof is connected to an EVSS_High power line, and the source electrode thereof is connected to the output terminal OUT of the buffer 185. The gate electrode of the second switch SW2 receives the EVSS_Sink signal, the drain electrode thereof is connected to the output terminal OUT of the buffer 185, and the source electrode thereof is connected to an EVSS_Low power line.

Accordingly, when the EVSS_Source signal is input at an on level, the first switch SW1 is turned on and the EVSS_High power is applied to the output terminal OUT of the EVSS buffer 185, and when the EVSS_Sink signal is input at an on level, the second switch SW2 is turned on and the EVSS_Low power is applied to the output terminal OUT of the EVSS buffer 185.

The power output from the output terminal OUT of the EVSS buffer 185 may be applied to the second power line PL2 and input as the EVSS_Up power applied to the upper ends of the power input lines PIL. The EVSS_Up power is the same voltage as the EVSS_Down power applied to the lower ends of the power input lines PIL in an active period immediately before a vertical blank period. That is, by applying the EVSS_Up power having the same electric potential as the EVSS_Down power, applied to the lower ends of the power input lines PIL immediately before the vertical blank period, to the upper ends of the power input lines PIL during the vertical blank period, electric potential variation such as EVSS rising that may occur in the power input lines PIL may be stabilized to the original electric potential of the EVSS_Down power.

Figure 6:
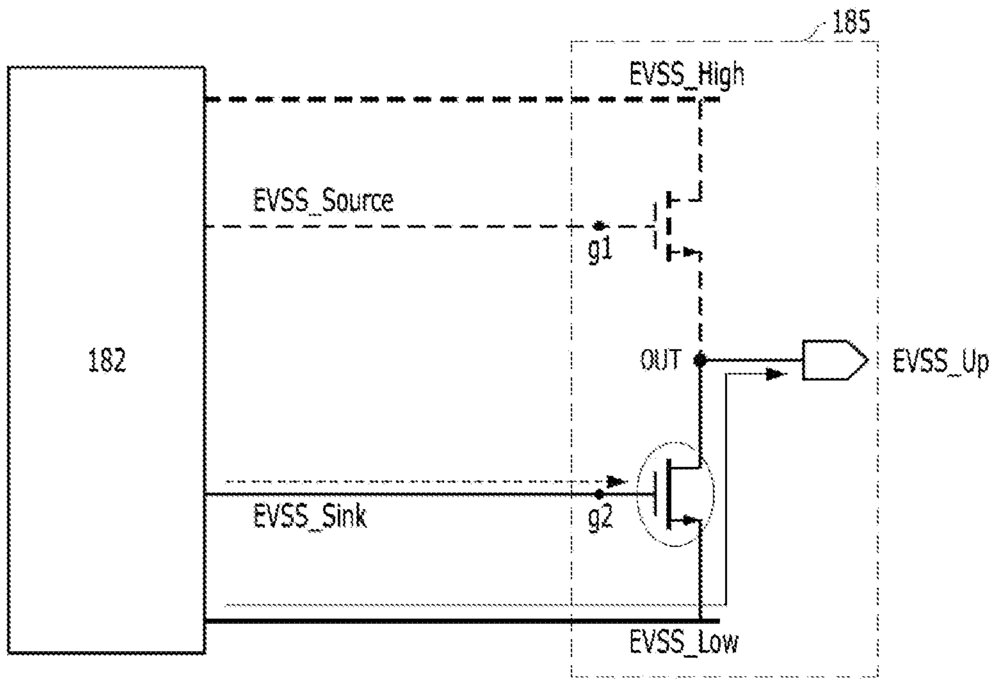
FIGS. 6 and 7 are diagrams for describing operations of the second power controller and the EVSS buffer according to the first aspect of the present disclosure.
Figure 7:
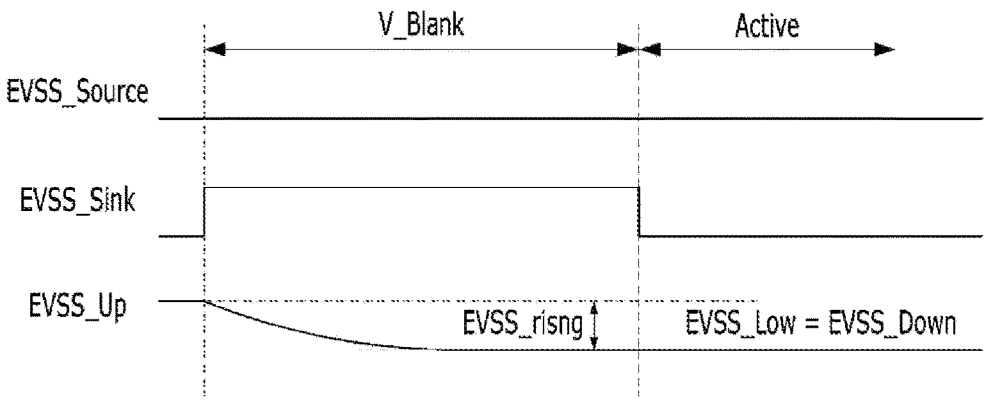

FIG. 6 is a diagram for describing operations of the second power controller 182 and the EVSS buffer according to the first aspect of the present specification, and FIG. 7 is a driving waveform diagram for the operations of FIG. 6. The first aspect of the present disclosure illustrates a case in which EVSS rising generated in an active period immediately before a vertical blank period V_Blank is eliminated by supplying the EVSS_Low power having the same electric potential as the EVSS_Down power.

Referring to FIGS. 6 and 7, at the time of entering the vertical blank period V_Blank, the second power controller 182 outputs the EVSS_Source signal at an off level and the EVSS_Sink signal at an on level.

The first switch SW1 of the EVSS buffer 185 is turned off according to the off-level EVSS_Source signal input to the gate electrode g1.

The second switch SW2 of the EVSS buffer 185 is turned on according to the on-level EVSS_Sink signal input to the gate electrode g2. As the second switch SW2 is turned on, the EVSS_Low power line and the output terminal OUT are connected by the second switch SW2. Accordingly, the electric potential of the EVSS_Up power of the output terminal OUT of the EVSS buffer 185 drops to the electric potential of the EVSS_Low power. The waveform diagram of the EVSS_Up power in FIG. 7 shows that the EVSS_Low power line is connected to the output terminal OUT of the EVSS buffer 185 during the vertical blank period V_Blank and thus the electric potential of the EVSS_Up power drops to the electric potential of the EVSS_Low power in a state where EVSS rising has occurred in the active period immediately before the vertical blank period V_Blank. The EVSS_Low power has the same electric potential as the EVSS_Down power applied in the active period immediately after the vertical blank period V_Blank. As a result, EVSS power from which the EVSS rising has been completely eliminated may be maintained in the active period immediately after the blank period V_Blank.

Figure 8:
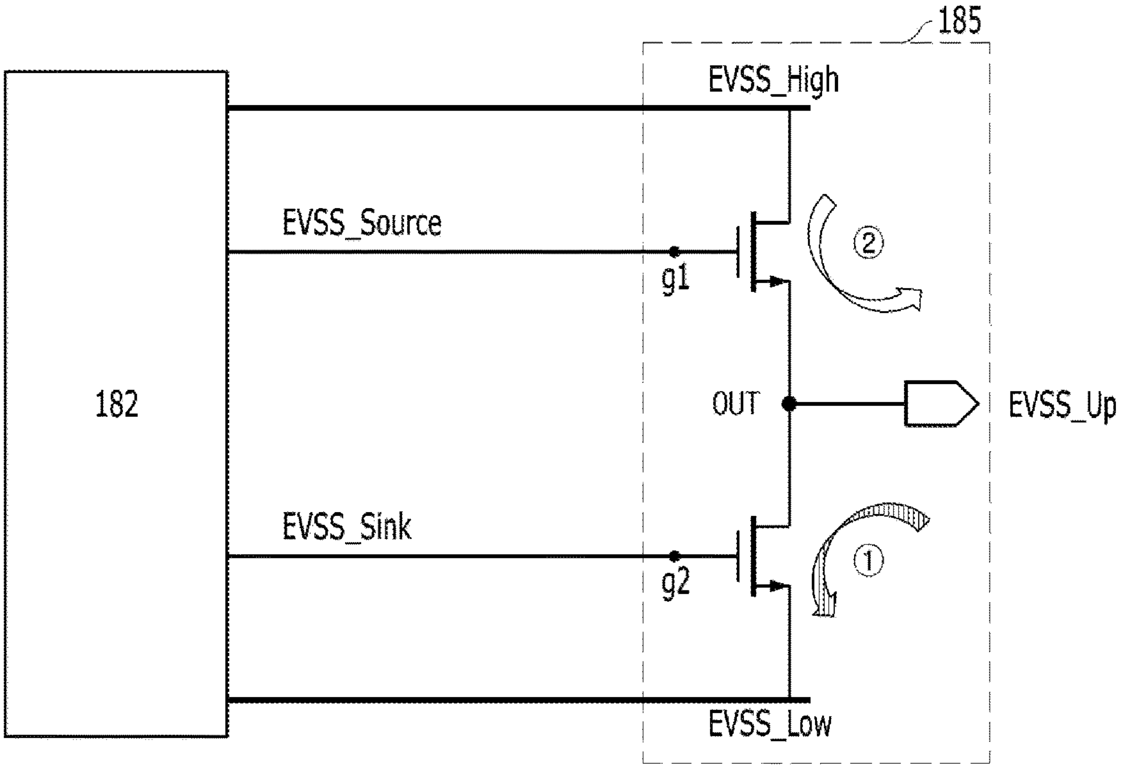
FIGS. 8 and 9 are diagrams for describing operations of the second power controller and the EVSS buffer according to the second aspect of the present disclosure.
Figure 9:
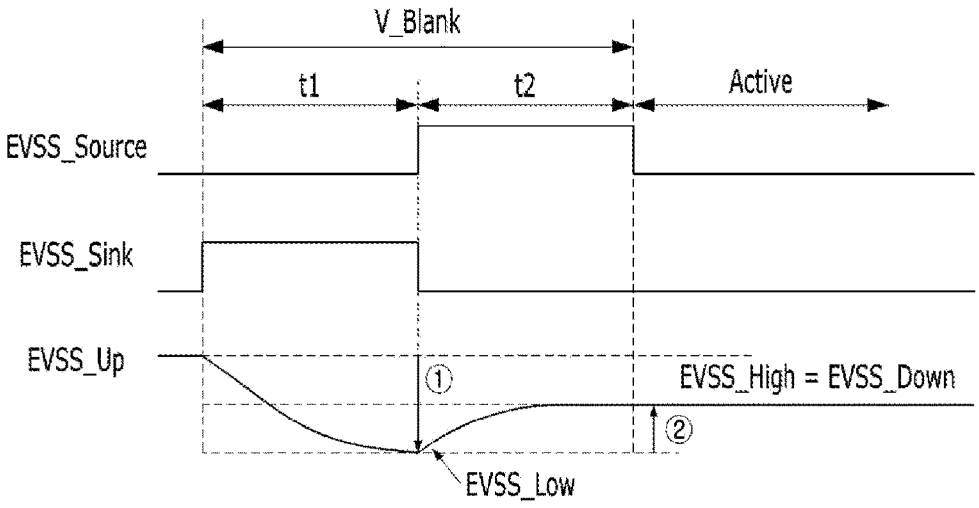

FIG. 8 is a diagram for describing operations of the second power controller 182 and the EVSS buffer according to the second aspect of the present disclosure and FIG. 9 is a driving waveform diagram for the operations of FIG. 8. The second aspect of the present disclosure illustrates an example of a case in which, to eliminate EVSS rising that has occurred in an active period immediately before a vertical blank period V_Blank, EVSS power is sufficiently lowered by supplying EVSS_Low power having a lower electric potential than a target EVSS electric potential, and then EVSS_High power having the same electric potential as the target EVSS electric potential, that is, the EVSS_Down power, is supplied to stabilize the EVSS power.

Referring to FIGS. 8 and 9, in the second aspect of the present disclosure, the second power controller 182 controls the vertical blank period V_Blank by dividing the same into a first period t1 and a second period t2. During the first period t1, the EVSS_Source signal is output at an off level and the EVSS_Sink signal is output at an on level. During the second period t2, the EVSS_Source signal is output at an on level and the EVSS_Sink signal is output at an off level.

During the first period t1, the first switch SW1 of the EVSS buffer 185 is turned off according to the off-level EVSS_Source signal input to the gate electrode g1, and the second switch SW2 is turned on according to the on-level EVSS_Sink signal input to the gate electrode g2. As the second switch SW2 is turned on, the EVSS_Low power line and the output terminal OUT are connected by the second switch SW2, and thus the electric potential of the EVSS_Up power of the output terminal OUT of the EVSS buffer 185 drops to the electric potential of the EVSS_Low power.

In the second period t2, the first switch SW1 of the EVSS buffer 185 is turned on according to the on-level EVSS_Source signal input to the gate electrode g1, and the second switch SW2 is turned off according to the off-level EVSS_Sink signal input to the gate electrode g2. As the first switch SW1 is turned on, the EVSS_High power line and the output terminal OUT are connected by the first switch SW1, and thus the electric potential of the EVSS_Up power of the output terminal OUT of the EVSS buffer 185 rises to the electric potential of the EVSS_High power.

Referring to the waveform diagram of the EVSS_Up power in FIG. 9, in a state where EVSS rising has occurred in an active period immediately before a vertical blank period V_Blank, after the EVSS_Low power line is connected to the output terminal OUT of the EVSS buffer 185 and thus the electric potential of the EVSS_Up power drops to the electric potential of the EVSS_Low power (①) in the vertical blank period V_Blank, the EVSS_High power line is connected to the output terminal OUT of the EVSS buffer 185, and thus the electric potential of the EVSS_Up power may rise to the electric potential of the EVSS_High power (②) in the second period t2. The electric potential of the EVSS_High power is the same as that of the EVSS_Down power applied in the active period immediately after the vertical blank period V_Blank. As a result, the target EVSS power may be applied in the active period immediately after the blank period V_Blank. In this way, the target EVSS power may be supplied after the EVSS power is sufficiently dropped to be lower than the target EVSS power within a shorter time, and thus EVSS rising may be effectively eliminated.

Figure 10:
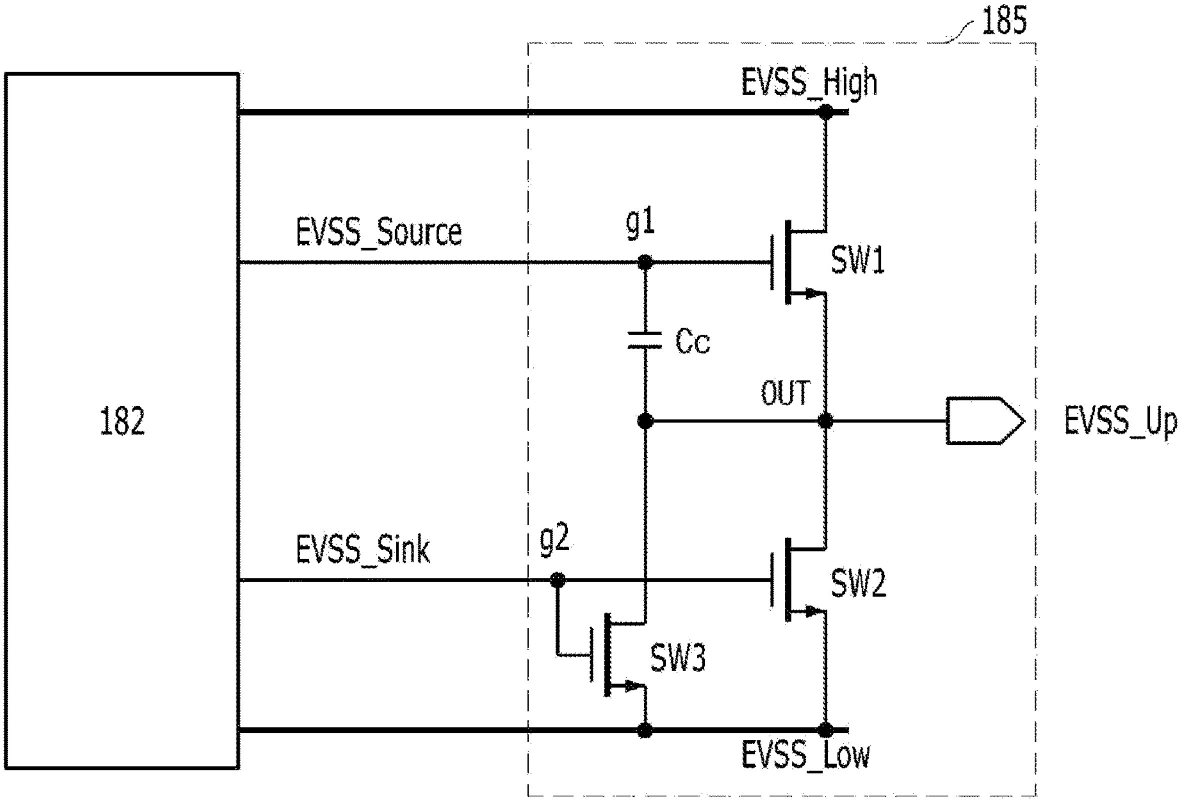
FIGS. 10 and 11 are diagrams for describing operations of the second power controller and the EVSS buffer according to a third aspect of the present disclosure.
Figure 11:
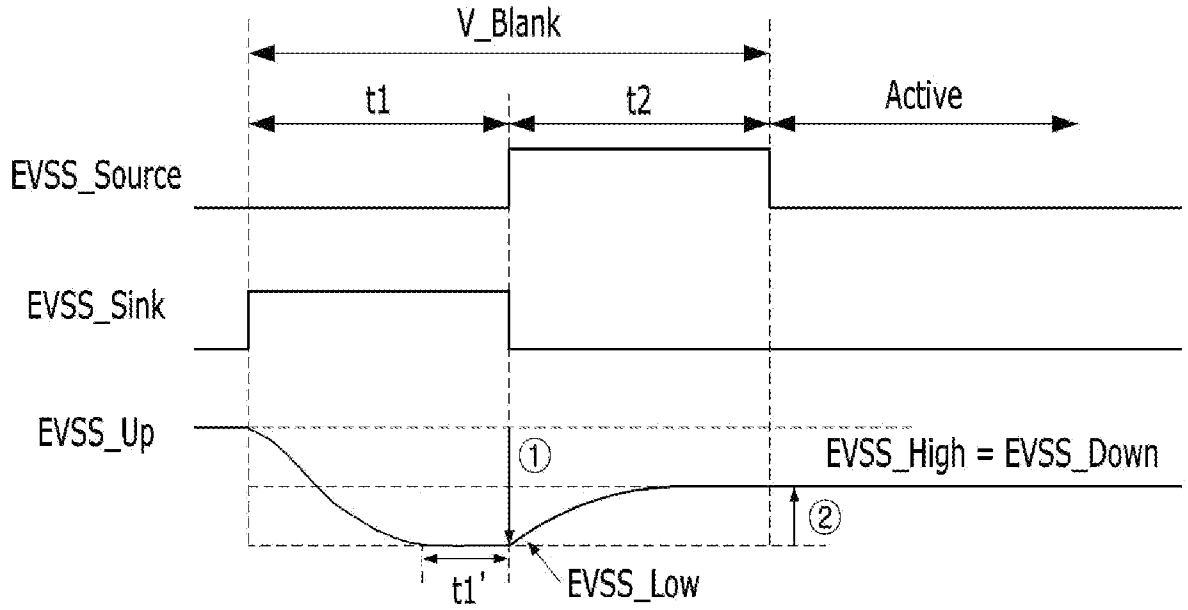

FIG. 10 is a diagram for describing operations of the second power controller 182 and the EVSS buffer according to a third aspect of the present disclosure and FIG. 11 is a driving waveform diagram for the operations of FIG. 10. The third aspect of the present disclosure illustrates an example of a case in which, to eliminate EVSS rising that has occurred in an active period immediately before a vertical blank period V_Blank, EVSS power is sufficiently lowered by supplying EVSS_Low power having a lower electric potential than target EVSS power, and then EVSS_High power having the same electric potential as the target EVSS power, that is, the EVSS_Down power, is supplied to stabilize the EVSS power.

The third aspect of the present disclosure further includes a capacitor Cc interposed between the gate electrode g1 of the first switch SW1 of the EVSS buffer 185 and the output terminal OUT to ensure output stability of the EVSS buffer 185, and a third switch SW3 that is turned on according to the EVSS_Sink signal to apply the EVSS_Low power to one end of the capacitor Cc and the output terminal OUT, thereby initializing the capacitor Cc, and allows a sinking operation of the output terminal OUT to be performed faster. The gate electrode of the first switch SW1 receives the EVSS_Source signal, the drain electrode thereof is connected to the EVSS_High power line, and the source electrode thereof is connected to the output terminal OUT of the buffer 185. The gate electrode of the second switch SW2 receives the EVSS_Sink signal, the drain electrode thereof is connected to the output terminal OUT of the buffer 185, and the source electrode thereof is connected to the EVSS_Low power line.

In the third aspect of the present disclosure, the second power controller 182 controls the vertical blank period V_Blank by dividing the same into a first period t1 and a second period t2 as in the second aspect. During the first period t1, the EVSS_Source signal is output at an off level and the EVSS_Sink signal is output at an on level. During the second period t2, the EVSS_Source signal is output at an on level and the EVSS_Sink signal is output at an off level.

Referring to FIGS. 10 and 11, the EVSS_Source signal is applied at an off level during the first period t1 and thus the first switch SW1 is turned off. The EVSS_Sink signal is applied at an on level, and thus the second switch SW2 and the third switch SW3 are turned on. As the second switch SW2 is turned on, the EVSS_Low power line and the output terminal OUT are connected by the second switch SW2, and thus the electric potential of the EVSS_Up power of the output terminal OUT of the EVSS buffer 185 drops to the electric potential of the EVSS_Low power. As the third switch SW3 is turned on, the EVSS_Low power line and the output terminal OUT are connected by the third switch SW3, and thus the electric potential of the EVSS_Up power of the output terminal OUT drops to the electric potential of the EVSS_Low power. Since the output terminal OUT of the EVSS buffer 185 is connected to the EVSS_Low power line through two power lines via the second switch SW2 and the third switch SW3, which are simultaneously turned on, the electric potential of the output terminal OUT may drop faster by t1' as compared to the second aspect in which only the second switch SW2 is connected. In addition, as the third switch SW3 is turned on, one electrode of the capacitor Cc connected to the same node as the output terminal OUT is initialized to the EVSS_Low voltage.

During the second period t2, the EVSS_Sink signal is applied at an off level, and thus the second switch SW2 and the third switch SW3 are turned off. The EVSS_Source signal is applied at an on level, and thus the first switch SW1 is turned on. As the first switch SW1 is turned on, the EVSS_High power line and the output terminal OUT are connected by the first switch SW1, and thus the electric potential of the EVSS_Up power of the output terminal OUT of the EVSS buffer 185 rises to the electric potential of the EVSS_High power. The capacitor Cc is connected between the gate electrode g1 of the first switch SW1 and the output terminal OUT corresponding to the drain of the first switch SW1 to stabilize the output voltage, and thus may prevent the electric potential of the EVSS_Up power from excessively rising.

Thereafter, both the EVSS_Source signal and the EVSS_Sink signal are output at an off level during the active period Active, and thus both the first switch SW1 and the second switch SW2 are maintained in an off state. Since the capacitor Cc is interposed between the gate node g1 and the output terminal OUT while the first switch SW1 is turned off during the active period Active, the voltage of the output terminal OUT may be maintained without fluctuation.

Referring to the waveform diagram of the EVSS_Up power in FIG. 11, in a state where EVSS rising has occurred in the active period immediately before the vertical blank period V_Blank, after the EVSS_Low power line is connected to the output terminal OUT of the EVSS buffer 185 and thus the electric potential of the EVSS_Up power drops to the electric potential of the EVSS_Low power in the first period t1 of the vertical blank period V_Blank, the EVSS_High power line is connected to the output terminal OUT of the EVSS buffer 185 in the second period t2 and thus the electric potential of the EVSS_Up power may rise to the electric potential of the EVSS_High power. The EVSS_High power has the same electric potential as the EVSS_Down power applied in the active period immediately after the vertical blank period V_Blank. As a result, the target EVSS power may be applied in the active period immediately after the blank period V_Blank. In this way, the target EVSS power may be supplied after EVSS power is sufficiently dropped to be lower than the target EVSS power within a shorter time, and thus EVSS rising may be effectively eliminated.

Figure 12:
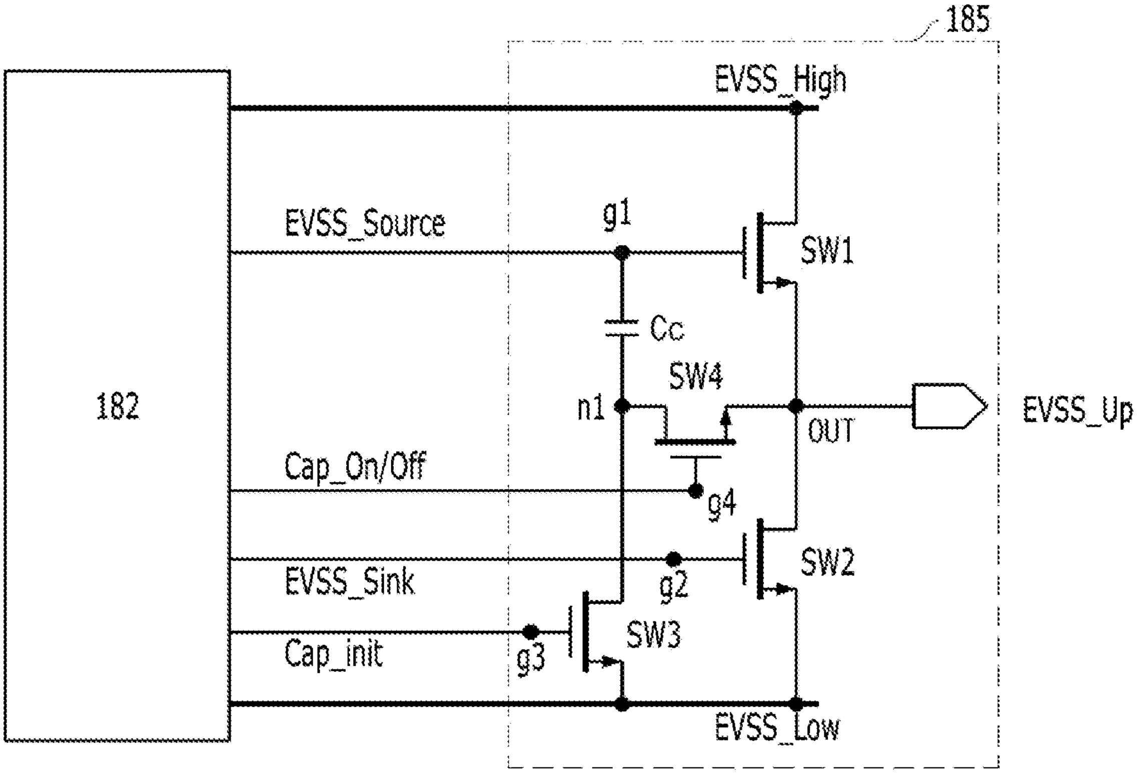
FIGS. 12 to 14 are diagrams for describing operations of the second power controller and the EVSS buffer according to a fourth aspect of the present disclosure.
Figure 13:
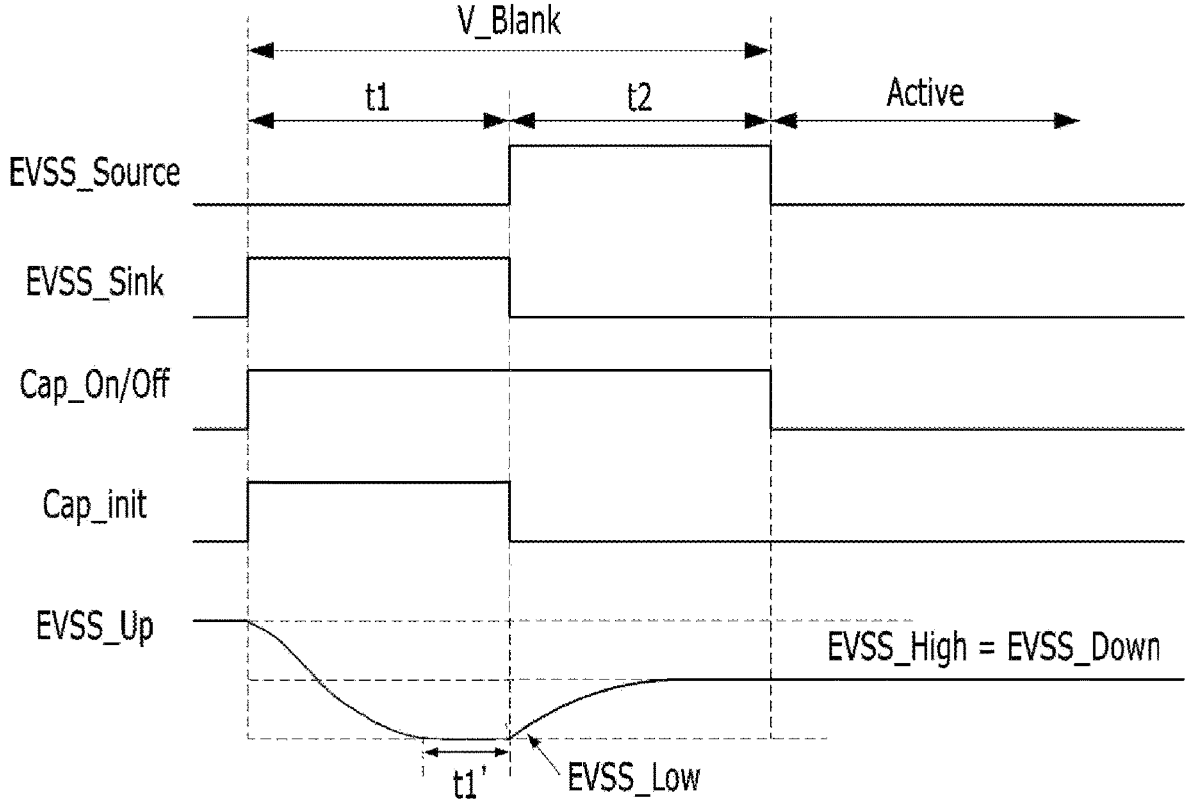
Figure 14:
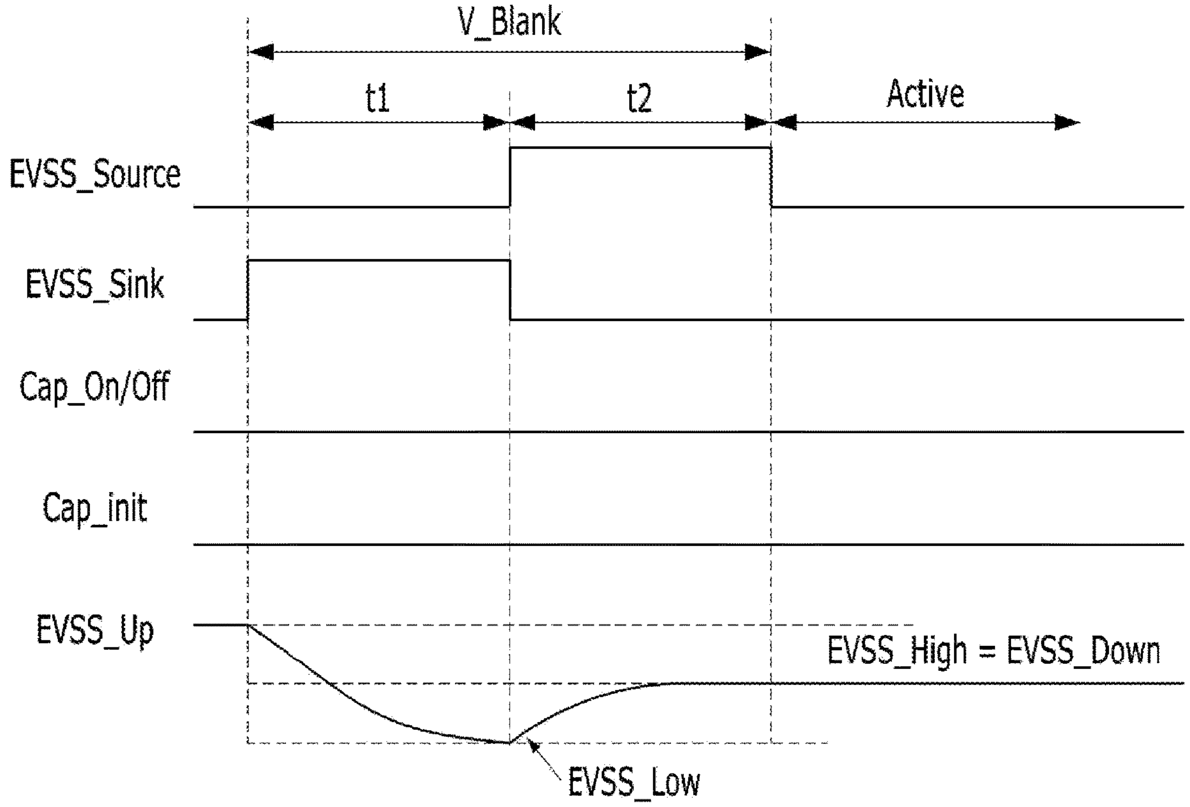

FIGS. 12 to 14 are diagrams for describing operations of the second power controller and the EVSS buffer according to a fourth aspect of the present disclosure.

FIG. 12 is a diagram for describing operations of the second power controller 182 and the EVSS buffer according to the fourth aspect of the present disclosure, and FIGS. 13 and 14 are driving waveform diagrams for the operations of FIG. 12. The fourth aspect of the present disclosure illustrates an example of a case in which, to eliminate EVSS rising that has occurred in an active period immediately before a vertical blank period V_Blank, EVSS power is sufficiently lowered by supplying EVSS_Low power having a lower electric potential than a target EVSS potential, and then EVSS_High power having the same electric potential as the target EVSS potential, that is, the electric potential of the EVSS_Down power, is supplied to compensate the EVSS power.

The fourth aspect of the present disclosure further includes a fourth switch SW4 that interconnects or disconnects the capacitor Cc added to the EVSS buffer 185 in the third aspect as needed.

In the fourth aspect of the present disclosure, the second power controller 182 generates and outputs the EVSS_High power, the EVSS_Low power, the EVSS_Source signal, the EVSS_Sink signal, a Cap_On/Off signal, and a Cap_init signal under the control of the timing controller 120.

In the fourth aspect of the present disclosure, the EVSS buffer 185 includes the first switch SW1 and the second switch SW2 which are turned on/off according to the EVSS_Source signal and the EVSS_Sink signal to apply the EVSS_High power or EVSS_Low power to the output terminal OUT of the buffer 185, the capacitor Cc connected between the gate electrode g1 of the first switch SW1 and a first node n1, a third switch SW3 connected to the first node n1 and the EVSS_Low power line, and a fourth switch SW4 connected between the first node n1 and the output terminal OUT.

The first switch SW1 and the second switch SW2 operate in the same manner as in the previous aspects. The first switch SW1 interconnects the EVSS_High power line and the output terminal OUT when the on-level EVSS_Source signal is input. The second switch SW2 interconnects the EVSS_Low power line and the output terminal OUT when the on-level EVSS_Sink signal is input.

The capacitor Cc has one electrode connected to the gate electrode of the first switch SW1 and the other electrode connected to the first node.

The gate electrode of the third switch SW3 receives the Cap_init signal, the source electrode thereof is connected to the first node, and the drain electrode thereof is connected to the EVSS_Low power line. The third switch SW3 is turned on when the Cap_init signal at an on level is applied and interconnects the first node and the EVSS_Low voltage line. Accordingly, one electrode of the capacitor Cc connected to the first node may be initialized to the EVSS_Low voltage. The third switch SW3 is turned off when the Cap_init signal at an off level is applied and cancels connection between the first node and the EVSS_Low voltage line.

The gate electrode g4 of the fourth switch SW4 receives the Cap_On/Off signal, the source electrode thereof is connected to the first node, and the drain electrode thereof is connected to the output terminal OUT. The fourth switch SW4 is turned on when the Cap_On/Off signal at an on level is applied and interconnects the first node n1 and the output terminal OUT. Accordingly, the capacitor Cc is connected between the gate electrode g1 of the first switch SW1 and the output terminal OUT corresponding to the drain of the first switch SW1 and thus may prevent the electric potential of the EVSS_Up power from excessively rising. The fourth switch SW4 is turned off when the Cap_On/Off signal at an off level is applied and cancels connection between the capacitor Cc and the output terminal OUT. Accordingly, the influence of the capacitor Cc during operation of the first switch SW1 may be removed.

In the fourth aspect of the present disclosure, the second power controller 182 controls the vertical blank period V_Blank by dividing the same into a first period t1 and a second period t2. During the first period t1, the EVSS_Source signal is output at an off level and the EVSS_Sink signal is output at an on level. During the second period t2, the EVSS_Source signal is output at an on level and the EVSS_Sink signal is output at an off level. The second power controller 182 may output the Cap_On signal and the on-level Cap_init signal when the capacitor Cc is used and output the Cap Off signal and the off-level Cap_init signal when the capacitor Cc is not used.

FIG. 13 illustrates a driving waveform diagram when the capacitor Cc is used, and FIG. 14 illustrates a driving waveform diagram when the capacitor Cc is not used.

Referring to FIGS. 12 and 13, when the capacitor Cc is used, the on-level Cap_On/Off signal is output during the vertical blank period V_Blank, and thus the fourth switch SW4 that interconnects the first node n1 and the output terminal OUT remains in an on state.

During the first period t1, the EVSS_Source signal is applied at an off level and thus the first switch SW1 is turned off. The EVSS_Sink signal is applied at an on level and thus the second switch SW2 is turned on, and the Cap_init signal is applied at an on level and thus the third switch SW3 is also turned on. As the second switch SW2 is turned on, the EVSS_Low power line and the output terminal OUT are connected by the second switch SW2, and the electric potential of the EVSS_Up power of the output terminal OUT of the EVSS buffer 185 drops to the electric potential of the EVSS_Low power. As the third switch SW3 is turned on, the electric potentials of the EVSS_Low power line and the first node n1 drop to the electric potential of the EVSS_Low power. Since the fourth switch SW4 interconnecting the first node n1 and the output terminal OUT is in an on state, the output terminal OUT is connected to the EVSS_Low power line through the second switch SW2 as well as the third switch SW3 and the fourth switch SW4. Accordingly, the electric potential of the output terminal OUT may drop faster by t1' as compared to a case in which only the second switch SW2 is connected to drop the electric potential of the output terminal OUT. Further, as the third switch SW3 is turned on, one electrode of the capacitor Cc connected to the first node n1 is initialized to the EVSS_Low voltage.

During the second period t2, the EVSS_Sink signal and the Cap_init signal are applied at an off level, and thus the second switch SW2 and the third switch SW3 are turned off. Accordingly, connection between the first node n1 and the output terminal OUT and the EVSS_Low power line is canceled. The EVSS_Source signal is applied at an on level and thus the first switch SW1 is turned on. As the first switch SW1 is turned on, the EVSS_High power line and the output terminal OUT are connected by the first switch SW1, and thus the electric potential of the EVSS_Up power of the output terminal OUT of the EVSS buffer 185 rises to the electric potential of the EVSS_High power. Since the fourth switch SW4 interconnecting the first node n1 and the output terminal OUT is in an on state, the capacitor Cc is connected between the gate electrode g1 of the first switch SW1 and the drain electrode corresponding to the output terminal OUT. Accordingly, the capacitor Cc connected between the gate electrode g1 of the first switch SW1 and the output terminal OUT corresponding to the drain of the first switch SW1 stabilizes the output voltage, and thus may prevent the electric potential of the EVSS_Up power from excessively rising.

The waveform of the EVSS_Up power in FIG. 13 shows that, in a state where EVSS rising has occurred in the active period immediately before the vertical blank period V_Blank, after the EVSS_Low power line is connected to the output terminal OUT of the EVSS buffer 185 and thus the electric potential of the EVSS_Up power drops to the electric potential of the EVSS_Low power in the first period t1 of the vertical blank period V_Blank, the EVSS_High power line is connected to the output terminal OUT of the EVSS buffer 185 and thus the electric potential of the EVSS_Up power rises to the electric potential of the EVSS_High power in the second period t2. The EVSS_High power has the same electric potential as the EVSS_Down power applied in the active period immediately after the vertical blank period V_Blank. As a result, target EVSS power may be applied in the active period immediately after the blank period V_Blank. In this way, after the EVSS power is sufficiently dropped to be lower than the target EVSS power within a shorter time, the target EVSS power may be supplied and thus the EVSS rising may be effectively eliminated.

Referring to FIGS. 12 and 14, when the capacitor Cc is not used, the off-level Cap_On/Off signal is output during the vertical blank period V_Blank, and thus the fourth switch SW4 interconnecting the first node n1 and the output terminal OUT remains in an off state, and the Cap_init signal is applied at an off level and thus the third switch SW3 is also turned off. Therefore, the second power controller and the EVSS buffer may operate as an equivalent circuit to the circuit of FIG. 8 in which the capacitor Cc is not connected.

During the first period t1, the EVSS_Source signal is applied at an off level and thus the first switch SW1 is turned off. The EVSS_Sink signal is applied at an on level and thus the second switch SW2 is turned on. As the second switch SW2 is turned on, the EVSS_Low power line and the output terminal OUT are connected by the second switch SW2, and thus the electric potential of the EVSS_Up power of the output terminal OUT of the EVSS buffer 185 drops to the electric potential of the EVSS_Low power.

During the second period t2, the EVSS_Sink signal is applied at an off level and thus the second switch SW2 is turned off. The EVSS_Source signal is applied at an on level and thus the first switch SW1 is turned on. As the first switch SW1 is turned on, the EVSS_High power line and the output terminal OUT are connected by the first switch SW1, and thus the electric potential of the EVSS_Up power of the output terminal OUT of the EVSS buffer 185 rises to the electric potential of the EVSS_High power.

According to the waveform of the EVSS_Up power in FIG. 14, the speed at which the electric potential of the output terminal OUT drops may be relatively delayed, for example, by t1' during the sinking operation in the first period t1, as compared to the waveform of the EVSS_Up power in FIG. 13.

The aspects of the present disclosure have the following effects.

In the aspects of the present disclosure, it is possible to prevent an EVSS rising phenomenon in which the low-potential voltage EVSS increases as the distance from the source of the low-potential voltage EVSS increases by applying the low-potential voltage EVSS from both sides of the panel.

In the aspects of the present disclosure, it is possible to prevent luminance non-uniformity depending on a position in the panel by independently supplying the low-potential voltage EVSS to both sides of the panel to uniformly maintain the low-potential voltage EVSS over the entire area of the panel.

In the aspects of the present disclosure, by applying a first low-potential voltage EVSS1 to one side of the panel during an active period in which image data is displayed and applying a second low-potential voltage EVSS2 to the other side of the panel during a vertical blank period, it is possible to sink an increase in the first low-potential voltage EVSS1 that may occur on the other side of the panel during the active period, thereby uniformly maintaining the level of the low-potential voltage EVSS in the entire area of the panel.

Effects according to the present disclosure are not limited by the above description, and various effects are included in the present disclosure.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display device comprising:

a display panel including pixels connected to a plurality of power input lines and receiving a low-potential voltage (EVSS) power;

a first power line connected to one end of each of the power input lines to apply a first EVSS power;

a second power line connected to another end of each of the power input lines to apply a second EVSS power having a same electric potential as that of the first EVSS power; and a power supply configured to apply the first EVSS power through the first power line in an active period for displaying an image and to apply the second EVSS power through the second power line in a vertical blank period after the active period.

2. The display device of claim 1, further comprising a timing controller configured to control the power supply to apply the first EVSS power in the active period and to apply the second EVSS power in the vertical blank period.

3. The display device of claim 2, wherein the power supply includes a first power controller configured to generate the first EVSS power and to apply the first EVSS power to the first power line under the control of the timing controller.

4. The display device of claim 2, wherein the power supply includes:

a second power controller configured to output a power signal and a control signal for generating the second EVSS power under the control of the timing controller; and an EVSS buffer configured to generate the second EVSS power according to the power signal and the control signal and to apply the second EVSS power to the second power line.

5. The display device of claim 4, wherein the second power controller outputs, to the EVSS buffer, high-potential power EVSS_High for generating the second EVSS power, low-potential power EVSS_Low lower than the high-potential power EVSS_High, and switching control signals for controlling output of the high-potential power EVSS_High and the low-potential power EVSS_Low.

6. The display device of claim 5, wherein the EVSS buffer includes:

a first thin film transistor (TFT) having a gate electrode to which a first switching control signal received from the second power controller is input, a first electrode connected to a supply line of the high-potential power, and a second electrode connected to an output terminal of the EVSS buffer; and a second TFT having a gate electrode to which a second switching control signal received from the second power controller is input, a first electrode connected to the output terminal of the EVSS buffer, and a second electrode connected to a supply line of the low-potential power.

7. The display device of claim 6, wherein the second TFT is turned on in the vertical blank period to apply the low-potential power to the second power line through the output terminal of the EVSS buffer such that the low-potential power is supplied as the second EVSS power.

8. The display device of claim 6, wherein the second TFT is turned on in a first period within the vertical blank period to apply the low-potential power to the output terminal of the EVSS buffer and then turned off, and wherein the first TFT is turned on in a second period after the first period to apply the high-potential power to the output terminal of the EVSS buffer such that the high-potential power is supplied as the second EVSS power.

9. The display device of claim 6, wherein the EVSS buffer further includes:

a capacitor having a first electrode connected to the gate electrode of the first TFT and a second electrode connected to the output terminal of the EVSS buffer; and a second TFT having a gate electrode to which the second switching control signal is input, a first electrode connected to the output terminal of the EVSS buffer, and a second electrode connected to the supply line of the low-potential power.

10. The display device of claim 6, wherein the EVSS buffer further includes:

a capacitor having a first electrode connected to the gate electrode of the first TFT and a second electrode connected to a first node;

a third TFT having a gate electrode to which a third switching control signal received from the second power controller is input, a first electrode connected to the first node, and a second electrode connected to the supply line of the low-potential power; and a fourth TFT having a gate electrode to which a fourth switching control signal received from the second power controller is input, a first electrode connected to the first node, and a second electrode connected to the output terminal of the EVSS buffer.

11. A method of driving a display device including pixels connected to a plurality of power input lines and receiving EVSS power, the method comprising:

applying first EVSS power using a first power line connected to one end of each of the power input lines, to which the first EVSS power is applied, in an active period for displaying an image; and applying the first EVSS power using a second power line connected to the other end of each of the power input lines, to which second EVSS power having the same electric potential as that of the first EVSS power is applied, in a vertical blank period.

12. The method of claim 11, wherein the applying of the first EVSS power using the second power line in the vertical blank period comprises:

applying low-potential power lower than the second EVSS power to the second power line in a first period within the vertical blank period; and applying the same power as the second EVSS power to the second power line in a second period after the first period.

* * * * *